US011206255B2

(12) United States Patent
Minami (10) Patent No.: US 11,206,255 B2
(45) Date of Patent: Dec. 21, 2021

(54) INFORMATION PROCESSING APPARATUS, AUTHENTICATION METHOD, AND NON-TRANSITORY RECORDING MEDIUM STORING INSTRUCTIONS FOR PERFORMING AN INFORMATION PROCESSING METHOD

(71) Applicant: Kohichiroh Minami, Kanagawa (JP)

(72) Inventor: Kohichiroh Minami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 332 days.

(21) Appl. No.: 16/449,879

(22) Filed: Jun. 24, 2019

(65) Prior Publication Data
US 2020/0036697 A1    Jan. 30, 2020

(30) Foreign Application Priority Data

Jul. 27, 2018   (JP) .............................. JP2018-141843

(51) Int. Cl.
*H04L 29/06*   (2006.01)
(52) U.S. Cl.
CPC ........ *H04L 63/083* (2013.01); *H04L 63/0876* (2013.01); *H04L 63/12* (2013.01)
(58) Field of Classification Search
CPC ... H04L 63/083; H04L 63/0876; H04L 63/12; H04L 63/08; H04L 2436/082
See application file for complete search history.

(56) References Cited

U.S. PATENT DOCUMENTS

| | | | | |
|---|---|---|---|---|
| 10,148,644 | B2 * | 12/2018 | Hosoda | H04N 1/4426 |
| 2013/0014240 | A1 * | 1/2013 | Osuki | H04L 63/083 |
| | | | | 726/7 |
| 2015/0089585 | A1 * | 3/2015 | Novack | H04L 63/1433 |
| | | | | 726/3 |
| 2017/0078100 | A1 * | 3/2017 | Kusumi | H04L 63/205 |
| 2018/0270313 | A1 | 9/2018 | Minami et al. | |
| 2018/0316670 | A1 * | 11/2018 | Brown | H04W 12/06 |
| 2018/0357021 | A1 | 12/2018 | Minami | |

FOREIGN PATENT DOCUMENTS

JP    2010-072760    4/2010

* cited by examiner

*Primary Examiner* — Khoi V Le
(74) *Attorney, Agent, or Firm* — IPUSA, PLLC

(57) ABSTRACT

An improved information processing apparatus, an authentication method and non-transitory recording medium are provided. The information processing apparatus authenticates a user based on first authentication information input by a user to generate an authentication result based on the first authentication information, receives an authentication request generated by first application software, authenticates the first application software based on second authentication information to generate an authentication result based on the second authentication information when the authentication request includes the second authentication information, acquires the authentication result of the user based on the first authentication information when the authentication request does not include the second authentication information, and executes processing based on one of the authentication result based on the first authentication information and the authentication result based on the second authentication information.

13 Claims, 10 Drawing Sheets

```
GET http://192.168.1.100/devicelog HTTP/1.1    ～DESCRIPTION 1
Host 192.168.1.30   ～DESCRIPTION 2
OneShotAuthorization: Basic aaa:bbb   ～DESCRIPTION 3
```

FIG. 6

```
HTTP/1.1 200 OK
Date: Sun, 06 Nov 1994 08:49:37 GMT          } DESCRIPTION 4
Content-Type: application/json; charset=utf-8
X-RemaindNumber: 0

{
 "machineInfo": {
   "machineNumber": "0F32126A",
 },
 "acquiredNumber": 1,
 "machineLog": [
   {
     "logProperty": {
       "logVersion": "2.0",
       "logId": "0000000032",
       "subPropNum": 1,
       "generalLogItem": [
         { "logName": "finishState", "logValue": "success" },
         { "logName": "originalType", "logValue": "printer.print" }
       ]
     }
   }
 ]
}
```

DESCRIPTION 5

FIG. 7

```
HTTP/1.1 401 Unauthorized
Date: Sun, 06 Nov 1994 08:49:37 GMT       } DESCRIPTION 6
Content-Type: application/json; charset=utf-8

{
    "errors":[
        {
            "message_id":"error.login_failed"     } DESCRIPTION 7
        }
    ]
}
```

FIG. 8

```
HTTP/1.1 403 Forbidden
Date: Sun, 06 Nov 1994 08:49:37 GMT       } DESCRIPTION 8
Content-Type: application/json; charset=utf-8

{
    "errors":[
        {
            "message_id":"error.not_authorized"    } DESCRIPTION 9
        }
    ]
}
```

INFORMATION PROCESSING APPARATUS, AUTHENTICATION METHOD, AND NON-TRANSITORY RECORDING MEDIUM STORING INSTRUCTIONS FOR PERFORMING AN INFORMATION PROCESSING METHOD

CROSS-REFERENCE TO RELATED APPLICATIONS

This patent application is based on and claims priority pursuant to 35 U.S.C. § 119(a) to Japanese Patent Application No. 2018-141843, filed on Jul. 27, 2018, in the Japan Patent Office, the entire disclosure of which is hereby incorporated by reference herein.

BACKGROUND

Technical Field

The present disclosure relates to an information processing apparatus, an authentication method and a non-transitory recording medium storing instructions which, when executed by one or more processors, cause the processors to perform an information processing method.

Background Art

When a user uses an information processing apparatus, a login process may be required. For example, in an image forming apparatus, acquisition or setting of information of the image forming apparatus can be performed under the authority (general user authority or administrator authority) of the user who has logged in based on predetermined authentication information and a print job can be executed.

Also, for example, the image forming apparatus can now perform a series of processes in cooperation with other devices, but in this case, the user has to log in to both devices. In order to cope with such a disadvantage, a technique for performing a series of processes by linking one device with another device while restricting functions available to the user is available.

SUMMARY

Embodiments of the present disclosure describe an improved information processing apparatus, an authentication method and a non-transitory recording medium storing instructions which, when executed by one or more processors, cause the processors to perform an information processing method. The information processing apparatus authenticates a user based on first authentication information input by a user to generate an authentication result based on the first authentication information, receives an authentication request generated by first application software, authenticates the first application software based on second authentication information to generate an authentication result based on the second authentication information when the authentication request includes the second authentication information, acquires the authentication result of the user based on the first authentication information when the authentication request does not include the second authentication information, and executes processing based on one of the authentication result based on the first authentication information and the authentication result based on the second authentication information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described below with reference to the attached drawings.

In an image forming apparatus, application software cannot operate when no user is logged in. On the other hand, when the user is logged in as a general user, information requiring administrator authority cannot be acquired, and when the user is logged in with administrator authority, a job cannot be executed. Moreover, when the user is logged in as a general user, application software operating in the background may want to obtain information that requires administrator authority (the user does not use the administrator authority information). Alternatively, when the user is logged in with administrator authority, application software operating in the background may need to execute a job. In order to solve these problems, the application software requires switching to login with administrator authority or login with a general user as needed.

The application software operating in the background is application software operating separately from the application software executed by the user. The user is often unaware of the application software operating in the background.

<Outline of Operations of Image Forming Apparatus According to the Present Embodiment>

Figure 1A:
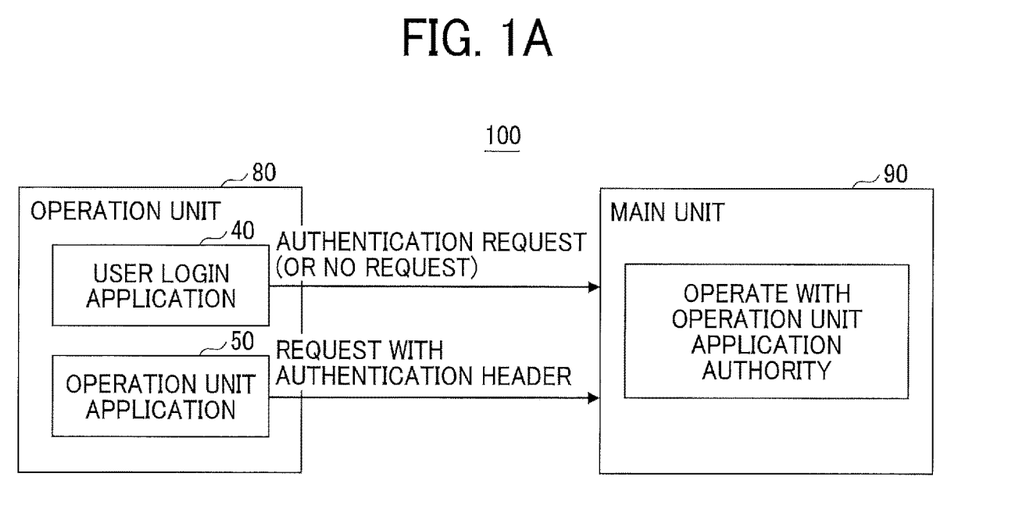
FIG. 1A and FIG. 1B are diagrams illustrating an example of a relation between authentication in an image forming apparatus and type of authority that the image forming apparatus operates with the authentication.
Figure 1B:
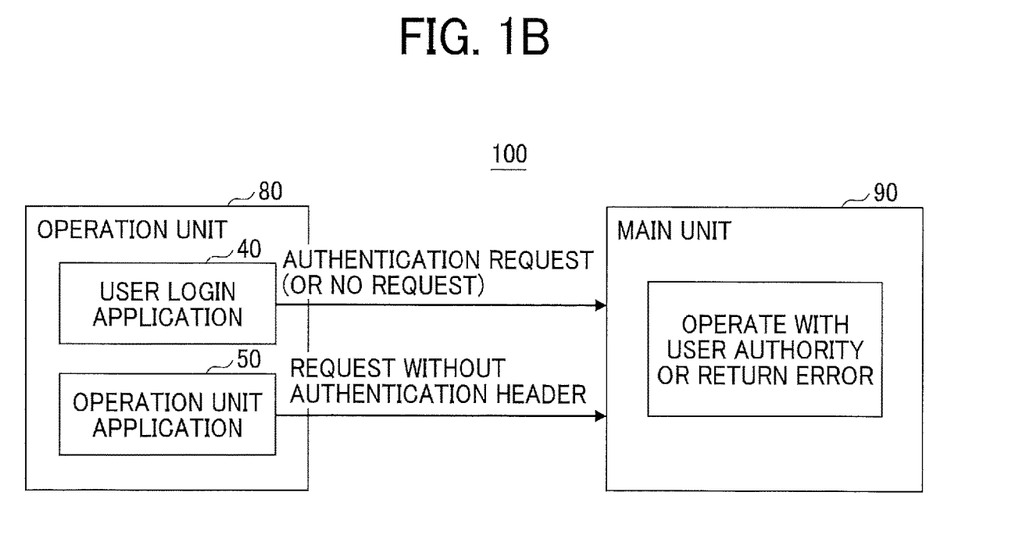

Referring to FIG. 1A and FIG. 1B, a description is given of an overview of operations performed by the image forming apparatus according to embodiments of the present disclosure. FIG. 1A and FIG. 1B are diagrams illustrating an example of a relation between authentication in the image forming apparatus and type of authority that the image forming apparatus 100 operates with the authentication. As illustrated in FIG. 1A and FIG. 1B, in the image forming apparatus 100 according to the present embodiment, an operation unit 80 and a main unit 90 are divided into separate devices and the operation unit 80 and the main unit 90 communicate with each other. Further, in the operation unit 80, a user login application 40 and an operation unit application 50 operate. The user login application 40 is application software for accepting user login, and the operation unit application 50 operates in the background.

The image forming apparatus 100 determines whether the operation is performed with authority authorized by an authentication of an authentication header or authority of a user who has logged in from the operation unit 80 by identifying whether an authentication header is included in a request (Hypertext Transfer Protocol (HTTP) request) that the operation unit application 50 transmits to the main unit 90.

FIG. 1A illustrates an example in which the request has an authentication header. The user login application 40 receives a login operation of the user and transmits an authentication request to the main unit 90. However, in the present embodiment, the user may or may not perform the login operation (whether the user is operating the operation unit 80 or not is irrelevant). In addition, the operation unit application 50 transmits a request including an authentication header to the main unit 90. In this example, the main unit 90 authenticates the operation unit application 50 with the authentication header and operates with the authority of the operation unit application 50.

FIG. 1B illustrates an example in which there is no authentication header in the request. The user login application 40 receives the login operation of the user and transmits an authentication request to the main unit 90. The user may or may not perform the login operation. In addition, the operation unit application 50 transmits a request without the authentication header to the main unit 90. In this example, the image forming apparatus 100 operates with the user's authority when the user is logged in, and basically returns an error when the user is not logged in because there is no authority. (Note that a request may be accepted when the request does not require authority.)

According to the above configuration, the operation unit application 50 can issue a request for processing to the main unit 90 even if the user is not logged in, and the operation unit application 50 can perform desired processing regardless of the user's operation.

When a general user logs in with the user login application 40 and the operation unit application 50 transmits a request having an authentication header to the main unit 90, the operation is performed with the authority of the operation unit application 50. When the operation unit application 50 logs in with the administrator authority, for example, administrator authority information necessary for the operation unit application 50 to operate can be acquired. When the administrator logs in with the user login application 40 and the operation unit application 50 transmits a request with the authentication header, an operation is performed with the authority of the operation unit application 50, so when the authority of the operation unit application 50 is a general user, the operation unit application 50 can execute a job.

As described above, the operation unit application 50 of the image forming apparatus 100 according to the present embodiment can acquire information requiring administrator authority even when the user is logged in as the general user and jobs can be executed even when the user is logged in with administrator authority. Further, while maintaining the same resource access policy for the image forming apparatus 100 (without changing the access policy), information requiring different authority can be acquired.

Terms Used in this Disclosure

The authentication process is to confirm whether the user of the image forming apparatus is the person himself or herself. Also, information used for authentication is called authentication information. The authentication information is a combination of identification information of the user and information verifying the identification information. For example, a password, an IC card number, or biometric information is used as the information for verifying the identification information. Authentication information may be account information, certificates, tokens, etc. When the authentication is successful, the user can log in. Login refers to an operation for identifying the identity and validity of a user at the start of use of a computer and acquiring credentials necessary for access to various resources. The resources that can be accessed may be limited according to the user's authority. The login may also be called logon, sign-in, or sign-on.

The authentication result means that the user is confirmed to be the person himself or herself (authentication is successful) or that the user can not be confirmed to be the person himself or herself (authentication is unsuccessful). Also, the authentication result may include what kind of authority the user has. The authority is the range of rights that can be officially acted upon and means the range that can be operated by the image forming apparatus.

There are general users and administrators who have different authorities. The general user is a user who uses the image forming apparatus 100, and the administrator is a user who manages the image forming apparatus 100, such as having the authority to change the settings of the image forming apparatus 100.

Configuration Example

Figure 2A:
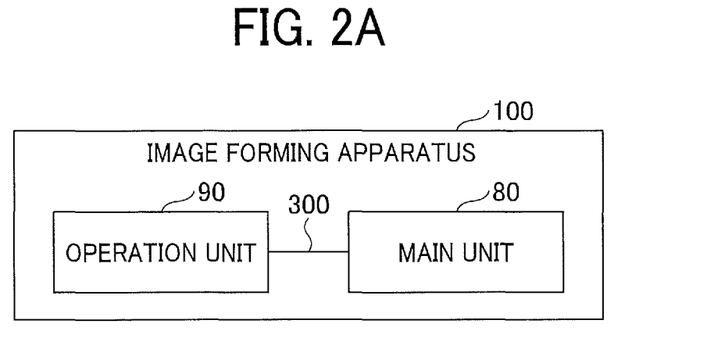
FIG. 2A and FIG. 2B are diagrams illustrating an example of a hardware configuration of the image forming apparatus.

An example of a hardware configuration of the image forming apparatus 100 is described with reference to FIG. 2A and FIG. 2B. FIG. 2A is a diagram illustrating the configuration of the image forming apparatus 100. The main unit 90 and the operation unit 80 are communicably connected to each other. Communication between the main unit 90 and the operation unit 80 is accomplished through a network, for example, Universal Serial Bus (USB), short distance wireless communication (Bluetooth (registered trademark) or infrared, etc.), or wired or wireless local area network (LAN).

The main unit 90 has one or more of such functions as image forming, scan, facsimile, and copy functions. The image forming apparatus 100 having a plurality of functions may be a multifunction peripheral (MFP). Further, the image forming apparatus 100 may be a printing apparatus or a printer.

While the main unit 90 provides the main functions of the image forming apparatus 100, the operation unit 80 operates application software to display various screens, receive inputs on the screens, and output processing results (display). That is, the operation unit 80 serves as a user interface in the image forming apparatus 100.

The operation unit 80 is, for example, an information processing apparatus such as a smartphone or a tablet terminal that can execute information processing independently. The operation unit 80 is connected to the main unit 90 instead of the operation panel conventionally provided as the dedicated operation unit 80 of the image forming apparatus 100. The operation unit 80 and the main unit 90 may be configured as one device. The operation unit 80 may be removable from the image forming apparatus 100 or may not be removable.

Figure 2B:
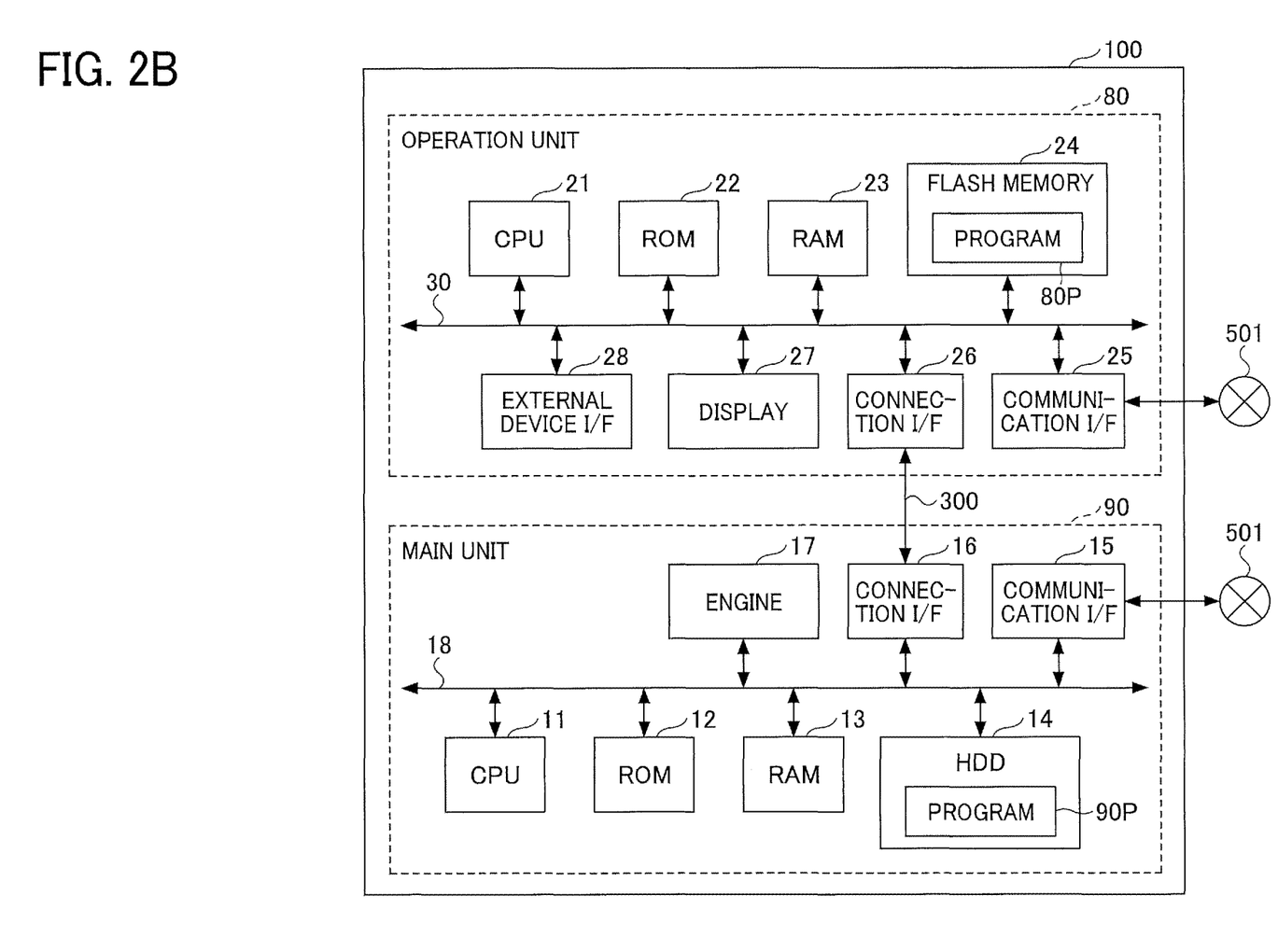

Referring to FIG. 2B, a hardware configuration of the image forming apparatus 100 is described. FIG. 2B is a block diagram illustrating an example of a hardware configuration of an image forming apparatus 100. The main unit 90 and the operation unit 80 of the image forming apparatus 100 are communicably connected to each other through a communication link 300.

The main unit 90 can perform an operation according to the instruction accepted by the operation unit 80. The main unit 90 can also communicate with an external device such as a client personal computer (PC) and can perform operations according to instructions received from the external device.

A hardware configuration of the main unit 90 is such that the main unit 90 includes a central processing unit (CPU) 11, a read only memory (ROM) 12, a random access memory (RAM) 13, a hard disk drive (HDD) 14, and a communication interface (I/F) 15, a connection I/F 16, and an engine 17, which are connected with one another through a system bus 18.

The CPU 11 controls overall operation of the main unit 90. The CPU 11 controls the engine 17 by executing a program 90P stored in the ROM 12 or the HDD 14 or the like, using the RAM 13 as a work area to control the overall operation of the main unit 90. In addition, various functions such as copy, scan, facsimile, and print functions are implemented.

The communication I/F 15 is an interface for connecting to the network 501. The connection I/F 16 is an interface for communicating with the operation unit 80 through the communication link 300.

The engine 17 is hardware that performs processing other than general-purpose information processing and communication for implementing the copy, scan, facsimile, and print functions. For example, a scanner for scanning and reading an image of a document (scan function), a plotter for printing on a sheet material such as paper (print function), and a facsimile unit for performing facsimile communication are provided. Furthermore, a specific option such as a finisher for sorting the printed sheet material or an automatic document feeder (ADF) for automatically feeding a document can be provided.

A hardware configuration of the operation unit 80 is such that the operation unit 80 includes a CPU 21, a ROM 22, a RAM 23, a flash memory 24, a communication I/F 25, a connection I/F 26, a display 27, an external device I/F 28, and a home key 29. These hardware components are mutually connected through the system bus 30.

The CPU 21 controls overall operation of the operation unit 80. The CPU 21 executes program 80P stored in the ROM 22, the flash memory 24, and the like, using the RAM 23 as a work area, to control overall operation of the operation unit 80 and to implement various functions described below, such as displaying information or images in response to an input from the user.

The communication I/F 25 is an interface for connecting to the network 501. The connection I/F 26 is an interface to communicate with the main unit 90 through the communication link 300.

The display 27 receives various inputs in response to the user's operations and displays various information such as information corresponding to the received operation, information indicating the operational status of the image forming apparatus 100, information indicating the setting status, etc. In this example, the display 27 is implemented by a liquid crystal display (LCD) having a touch panel function, however, the LCD is just an example. In another example, the display 27 may be implemented by an organic electroluminescence (EL) display having a touch panel function. In addition to the display 27, the operation unit 80 may include a hardware key or a display lamp. For example, a hardware key called a home key may be implemented to enable the user to display a list of available applications by pressing the home key.

The external device I/F 28 is an interface for communicating with an external device, and can be connected to, for example, an integrated circuit (IC) card reader/writer.

<Software Configuration>

Figure 3:
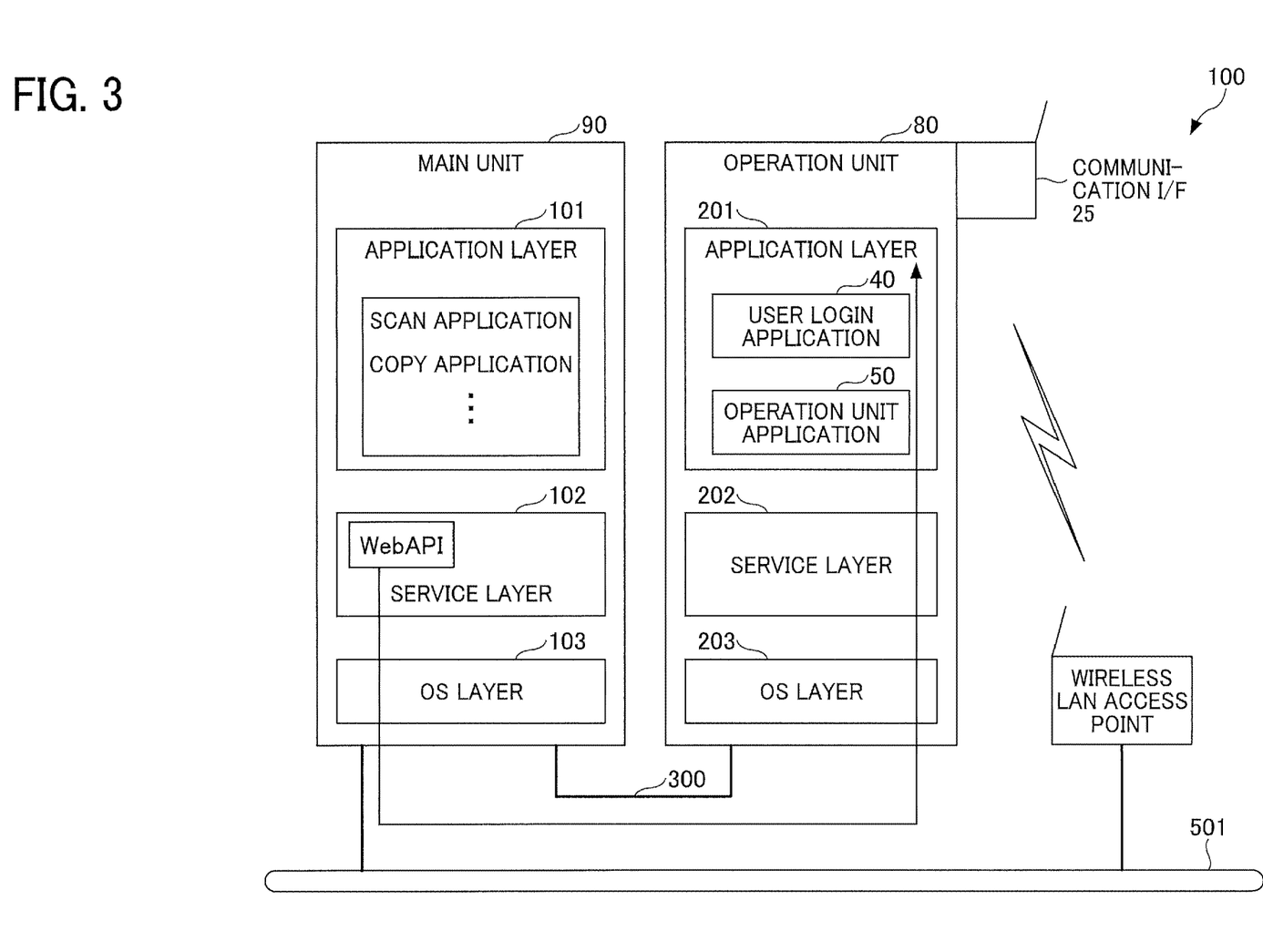
FIG. 3 is a block diagram illustrating an example of a software configuration of the image forming apparatus.

A software configuration of the image forming apparatus 100 is described with reference to FIG. 3. FIG. 3 is a block diagram illustrating a software configuration of the image forming apparatus 100. The main unit 90 includes an application layer 101, a service layer 102, and an operating system (OS) layer 103 as illustrated in FIG. 3. The entities of the application layer 101, the service layer 102, and the OS layer 103 are various types of software stored in the ROM 12 or the HDD 14. Various functions are provided by the CPU 11 executing the software.

The software of the application layer 101 is application software that causes hardware resources to operate to provide specific functions. Examples of the application software include a copy application that provides the copy function, a scan application that provides the scan function, a facsimile application that provides the facsimile function, a print application that provides the print function and a device information notification application that notifies information of the image forming apparatus 100.

The software of the service layer 102, which intervenes between the application layer 101 and the OS layer 103, provides the application with an interface for using the hardware resources of the main unit 90. More specifically, the software for the service layer 102 provides the functions of receiving the operation requests to the hardware resources and mediating the operation requests. Examples of the operation requests that the service layer 102 receives may include a request for scanning by the scanner and a request for printing by the plotter.

The interface function by the service layer 102 may be provided also to the application layer 201 of the operation unit 80 as well as to the application layer 101 of the main unit 90. In other words, the application layer 201 (application) of the operation unit 80 is also capable of implementing functions that use the hardware resources such as the engine 17 of the main unit 90 through the interface function of the service layer 102. For example, the interface function of the service layer 102 is provided by web application programming interface (API). The operation unit 80 and the main unit 90 can communicate through the communication link 300 as a network.

The software of the OS layer 103 is an operating system (OS) that provides the basic functions of controlling the hardware that the main unit 90 includes. The software of the service layer 102 converts each of the requests received from various applications for using the hardware resources into a command that is interpretable by the OS layer 103. The software of the service layer 102 passes the command to the OS layer 103. The software of the OS layer 103 executes the command to enable the hardware resources to operate in accordance with the request by the application.

The operation unit 80 similarly includes the application layer 201, a service layer 202 and an OS layer 203. The application layer 201, the service layer 202 and the OS layer 203 of the operation unit 80 has a similar layer structure as the main unit 90. However, functions provided by application software of the application layer 201 and operation requests supported by the service layer 202 are different from the main unit 90. The application software of the application layer 201 may be software for operating hardware resources of the operation unit 80 to provide predetermined functions. However, the application software is mainly for the user interface (UI) for performing operations and display relating to functions provided to the main unit 90 (copy UI function, scan UI function, facsimile UI function, printer UI function, initial setting UI function, etc.) and for providing a browser function.

In the present embodiment, the software of the OS layer 103 that the main unit 90 includes and the software of the OS layer 203 that the operation unit 80 includes are different from each other in order to maintain independence of the functions. In other words, the main unit 90 and the operation unit 80 operate independently of each other on separate operating systems. For example, Linux (registered trademark) may be used as the software of the OS layer 103 of the main unit 90, and Android (registered trademark) may be used as the software of the OS layer 203 of the operation unit 80.

As described above, in the image forming apparatus 100 according to the present embodiment, the main unit 90 and the operation unit 80 respectively operate on separate operating systems. Accordingly, communication between the main unit 90 and the operation unit 80 are performed as communication between separate apparatuses instead of interprocess communication within a common apparatus. Examples of the communication between the main unit 90 and the operation unit 80 may include command communication, which is an operation of transmitting information (e.g., instruction contents from a user) received by the operation unit 80 to the main unit 90. The operation unit 80 communicates commands to the main unit 90 to use the functions of the main unit 90. Examples of the information notified from the main unit 90 to the operation unit 80 may include an execution status of operation in the main unit 90 and settings that are made in the main unit 90.

In addition, power is supplied from the main unit 90 to the operation unit 80 through the communication link 300. Accordingly, the power control of the operation unit 80 may be performed separately (independently) from the power control of the main unit 90.

<Functions>

Figure 4:
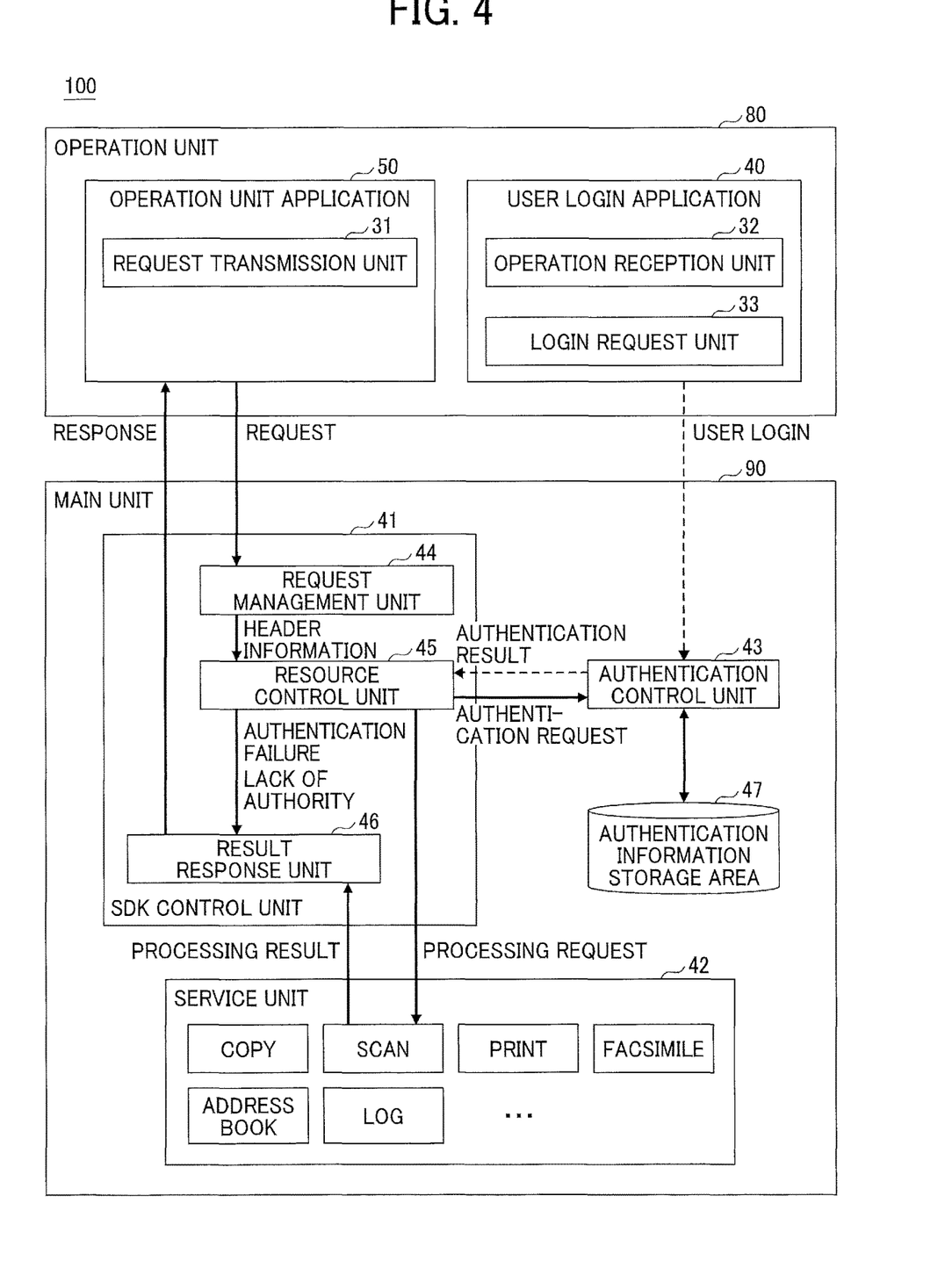
FIG. 4 is a block diagram illustrating a functional configuration of the image forming apparatus.

The functions of the image forming apparatus 100 are described with reference to FIG. 4. FIG. 4 is a block diagram illustrating a functional configuration of the image forming apparatus 100.

(Operation Unit)

A user login application 40 and an operation unit application 50 operate in the operation unit 80. Only main application software of the present embodiment is illustrated in FIG. 4. The operation unit application 50 is a generic term for application software operating in the background in the operation unit 80. Therefore, more than one application programs may be included in the operation unit application 50. For example, the main unit 90 receives a facsimile transmission while no one is present, such as in the middle of the night, and the operation unit application 50 operating on the operation unit 80 transfers the received data from the main unit 90 to an external server. As described above, the operation unit application 50 is application software that operates without a user operation. However, operation may be performed by the user. Such application software may be a resident application.

The user login application 40 is application software that accepts user login. The user login application 40 displays a lock screen for accepting login and accepts input of authentication information on the lock screen. The user login application 40 can be used before the user logs in. The authentication information may be, for example, a user ID and a password, a card number of an IC card, or biometric information.

The operation unit application 50 has a request transmission unit 31, and the user login application 40 has an operation reception unit 32 and a login request unit 33. Each of these functions supported by operation unit 80 is implemented by one of the components illustrated in FIG. 2 operating according to an instruction from the CPU 21 according to the program (operation unit application 50 and user login application 40) deployed from the flash memory 24 to the RAM 23. These programs are distributed from a server for program distribution or on a storage medium.

In the present embodiment, the request transmission unit 31 communicates with the main unit 90 by HyperText Transfer Protocol (HTTP) communication that calls the Web API of the service layer 102 of the main unit 90. However, the communication protocol used between the operation unit 80 and the main unit 90 need not be limited to HTTP. For example, HTTPs, WevDAV, etc. may be used. When issuing a request for some processing to the main unit 90, the request transmission unit 31 generates and transmits an HTTP request (hereinafter, simply referred to as a request). The trigger for request transmission may vary depending on the operation unit application 50, for example, reception of a document by fax, arrival of a predetermined time, reception of data from the outside, or user operation.

Figure 5:
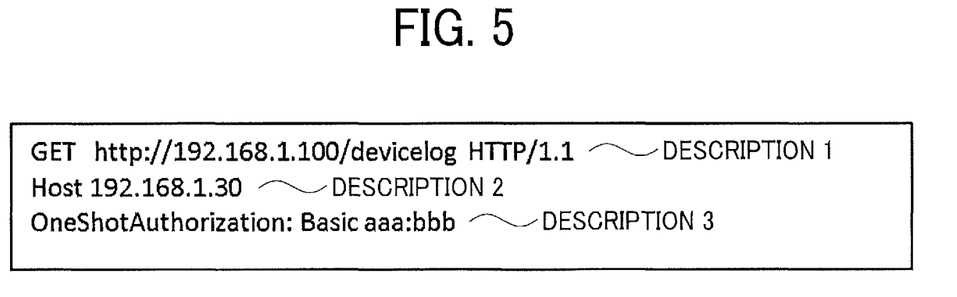
FIG. 5 is a diagram illustrating an example of a request transmitted by a request transmission unit.

The request transmission unit 31 can generate and include authentication information of the operation unit application 50 as a part of header information when transmitting a request. The header information refers to information in header portion of a packet of an HTTP message. An example of the header information is illustrated in FIG. 5. For example, a method such as GET, a uniform resource locator (URL) of a request destination, and an HTTP version are set in a first line (request line). Various information is included in second and subsequent lines (header lines). The authentication information set in the header information is referred to as an "authentication header" in the present embodiment. An example of the authentication information is ID and a password of operation unit application 50, but the authentication information is not limited to this example. A token or a certificate may be another example of the authentication information.

The request transmission unit 31 switches whether to set the authentication header in the request. For example, when obtaining information based on administrator authority, or when executing a job based on general user authority, the authentication header is set in the request. For example, when a user is logged in or when a user having a predetermined authority or higher is logged in, the authentication header is not set in the request in order to prioritize user's operation. Alternatively, whether to set the authentication header in the request may be switched depending on type of the operation unit application 50. The operation unit application 50 that requires the general user or administrator authority sets the authentication header in the request, and the other operation unit application 50 does not set the authentication header in the request.

The request transmission unit 31 receives an HTTP response to the request from the main unit 90 (hereinafter, simply referred to as a response).

The operation reception unit 32 accepts various operations on the operation unit 80 from the user. Input of the authentication information is accepted in the present embodiment. The login request unit 33 transmits an authentication request including authentication information to the main unit 90. When the login request unit 33 receives the successful authentication result, the user login application 40 erases the lock screen, and a list of application software available to the user is displayed on the display. The login request unit 33 communicates with the main unit 90 by a request such as HTTP, but a request appropriate for communication with the main unit 90 is used.

(Main Unit)

The main unit 90 includes a software development kit (SDK) control unit 41, an authentication control unit 43, and a service unit 42. These functions of the main unit 90 are implemented by any one of the components illustrated in FIG. 2 operated by an instruction from the CPU 11 according to a program deployed from the HDD 14 to the RAM 13. These programs are distributed from a server for program distribution or in a storage medium.

The service unit 42 is a software module group controlling various hardware resources and the like and providing an interface for supporting the upper application (SDK control unit 41) and the like to use the function. The service unit 42 has, for example, a function to control copying, a function to control a scanner, a function to control a printer, a function to control transmission and reception of a facsimile, a function to manage an address book, and a function to record a log.

The authentication control unit 43 receives the authentication request including authentication information from the user login application 40, confirms whether or not a corresponding user exists in an authentication information storage area 47 (whether or not the same authentication information exists), and sends an authentication result to the user login application 40. The authentication control unit 43 notifies the resource control unit 45 in the SDK control unit 41 of the authentication result. The authentication result includes not only the success or failure of authentication but also the authority of the user (e.g., whether general user authority or administrator authority). The authentication request may be granted or restricted depending on the user's authority and what authority the authentication request requires.

The SDK control unit 41 includes an Application Programming Interface (API) for developing application software (hereinafter referred to as SDK application) compatible with the SDK and provides an execution environment of the SDK application. Furthermore, the SDK control unit 41 enables the SDK application to use the service unit 42. The form of the API may be, for example, a function or object-oriented classes and methods of classes. For example, the SDK control unit 41 provides an SDK API related to the copy function, an SDK API related to the scan function, an SDK API related to the print function, and the like to the SDK application. The SDK control unit 41 may include Java (registered trademark) Virtual Machine (VM). In this case, the SDK application is implemented by Java (registered trademark) language. However, the types of programs that can be installed on the main unit 90 are not limited to the SDK application.

The SDK application is a program (also referred to as a plug-in) additionally installed to extend a function of the image forming apparatus 100 after the image forming apparatus 100 is shipped. In FIG. 4, a request management unit 44, a resource control unit 45, and a result response unit 46 are illustrated as the SDK applications. The plug-in may be a native application developed without using the SDK.

The request management unit 44 receives a request from the operation unit application 50 and sends header information included in the request to the resource control unit 45 as illustrated in FIG. 4. The header information may or may not include an authentication header.

The resource control unit 45 determines whether or not there is an authentication header in the header information. If there is an authentication header, the resource control unit 45 sends authentication information of the authentication header to the authentication control unit 43 for authentication. The resource control unit 45 acquires an authentication result from the authentication control unit 43. The authentication result includes the authority of the operation unit application 50.

When the authentication is successful and the operation unit application 50 is authorized to execute the request, the resource control unit 45 distributes the request for the service of the service unit 42 based on the URL of the request line. The service unit 42 executes processing according to the request and sends the processing results, such as setting information and job execution results, to the result response unit 46 of the SDK control unit 41. The result response unit 46 creates a response and transmits (returns) the response to the operation unit application 50.

When the authentication fails or the operation unit application 50 is not authorized to execute the request, the resource control unit 45 notifies the result response unit 46 of the authentication failure or lack of authority. The result response unit 46 creates a response and transmits (returns) the response to the operation unit application 50.

<Examples of Request and Response>

Examples of request and response are described using FIGS. 5 to 8. FIG. 5 is an example of a request transmitted by the request transmission unit 31. Description 1 to Description 3 are the header information. Description 1 is the request line. Description 1 uses the GET method to call an API called devicelog for the URL (address) "192.168.1.100". The devicelog is an API for returning log information described here as an example. "HTTP/1.1" is a version of HTTP.

The "Host 192.168.1.30" of the description 2 is a server name of transmission destination of the request. The server name is essential in HTTP/1.1. when specifying a virtual server or the like.

"OneShotAuthorization" of description 3 is the authentication header. "Basic" indicates an authentication method. "Aaa" is a username and "bbb" is a password. Although the user name and password are in plain text in FIG. 5, the user name and password may be encoded and/or encrypted to avoid hacking.

Figure 6:
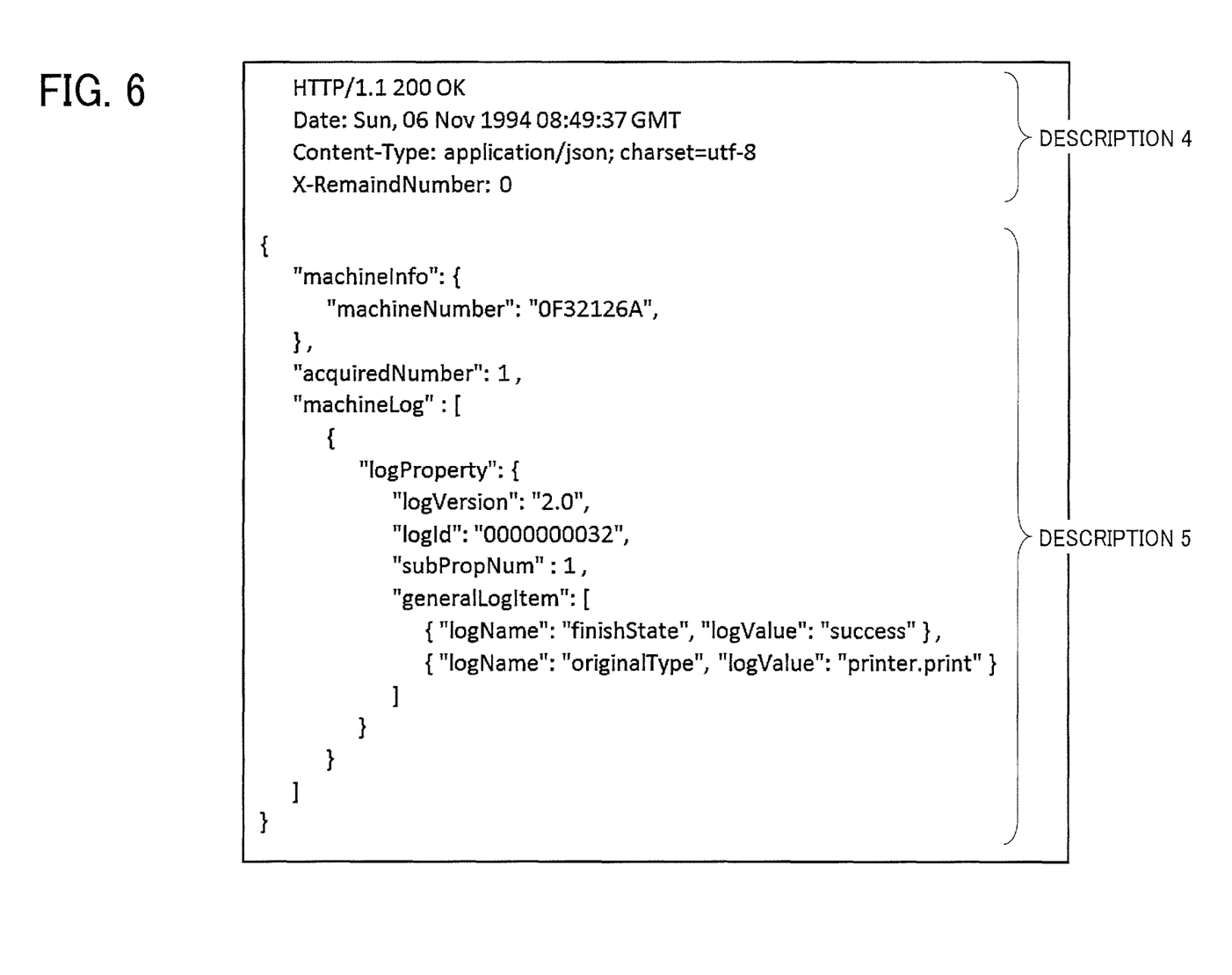
FIG. 6 is a diagram illustrating an example of a response when authentication is successful.

FIG. 6 is an example of a successful authentication response that the result response unit 46 transmits. "200" of "HTTP/1.1 200 OK" of the description 4 is a status code. Code "200" means that the request is successful and the information corresponding to the request is returned together with the response. The rest of the description 4 is bibliographic information. Description 5 is an example of log information acquired by the API called devicelog and returned to the result response unit 46. The request and response may be transmitted in JavaScript Object Notation (JSON) format as illustrated in FIGS. 5 to 8, but Extensible Markup Language (XML) format or the like may be used.

When a response as illustrated in FIG. 6 is returned, the main unit 90 operates as follows. First, when the resource control unit 45 acquires from the authentication control unit 43 an authentication result indicating that an authentication based on an authentication header is successful, the service unit 42 is launched, and the service unit 42 sends a processing result to the result response unit 46. The result response unit 46 generates a response including information that the request has been accepted as in the description 4 and the log information of the description 5.

Figure 7:
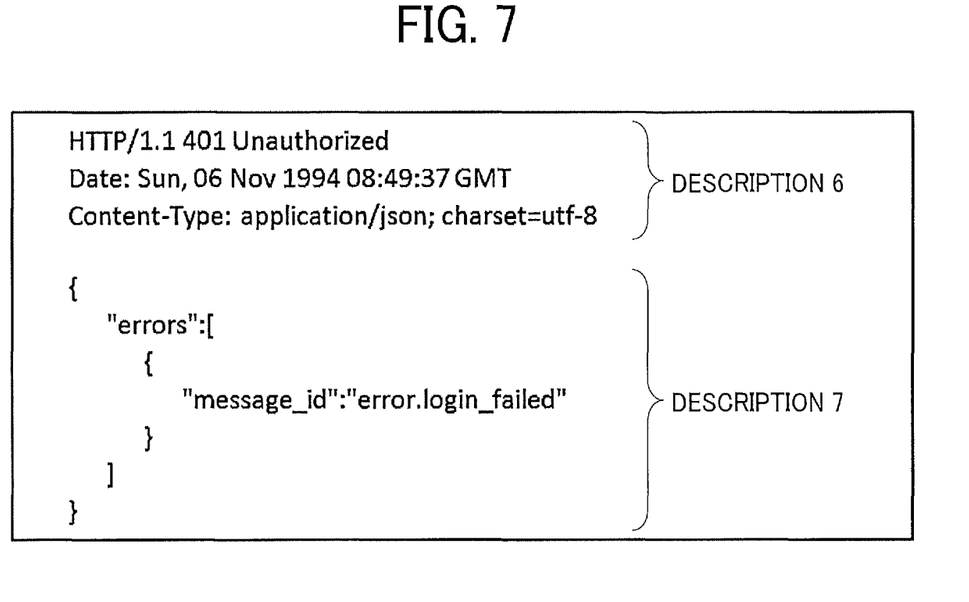
FIG. 7 is a diagram illustrating an example of a response when authentication is not successful.

FIG. 7 is an example of a response indicating an authentication failure which the result response unit 46 transmits. The status code "401" of the "HTTP/1.1 401 Unauthorized" of the description 6 indicates the authentication failure. The authentication failure indicates that the combination of the username/password added to the authentication header of the request is not stored in the authentication information storage area 47 (i.e., the combination of the username/password is incorrect). The same is true if the username/password combination entered by the user is incorrect. Description 7 is an error message indicating authentication failure.

The main unit 90 operates as follows when a response as illustrated in FIG. 7 is returned. The result response unit 46 generates a response indicating that the request is rejected due to the authentication failure as illustrated in the description 6, and an error message indicating that the combination of the username/password is incorrect as illustrated in the description 7, in response to a notification of an authentication failure from the resource control unit 45.

Figure 8:
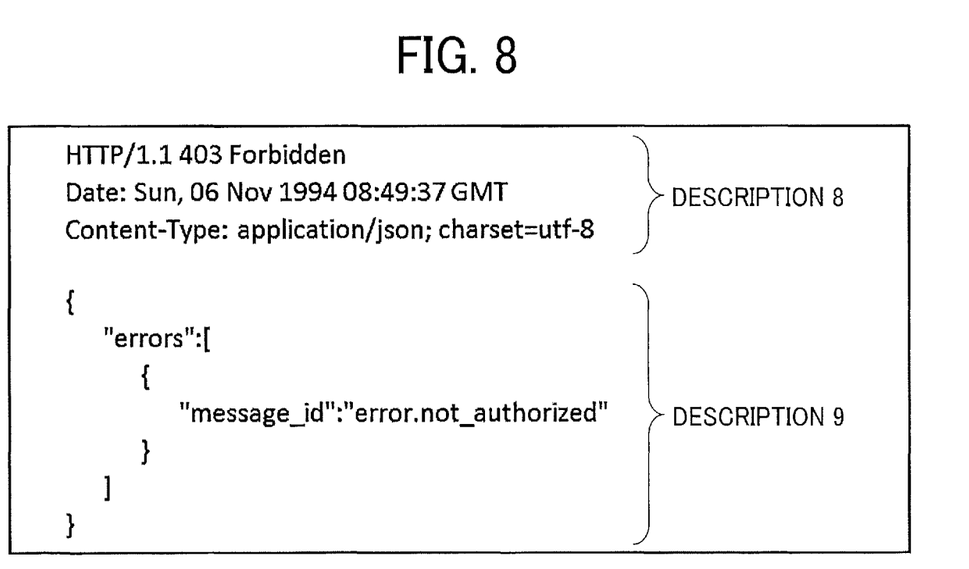
FIG. 8 is a diagram illustrating an example of a response indicating lack of authority.

FIG. 8 is an example of a response indicating an authentication failure that the result response unit 46 transmits. The status code "403" of "HTTP/1.1 403 Forbidden" of description 8 indicates that although URL of a request destination exists, authority to display information is not given, and access is denied. When the username/password of the authentication header is correct but there is no access right to the information, a status code 403 representing "lack of authority" is returned. The lack of right of access to the information occurs, for example, when a general user makes a request for an API that requires administrator authority. Description 9 is an error message indicating lack of authority.

The main unit 90 operates as follows when a response as illustrated in FIG. 8 is returned. The result response unit 46 generates a response indicating that the request is rejected due to the lack of authority as illustrated in the description 8, and an error message indicating that the access right to the information is not given as illustrated in the description 9, in response to a notification of lack of authority from the resource control unit 45.

<Operation Procedure>

Figure 9:
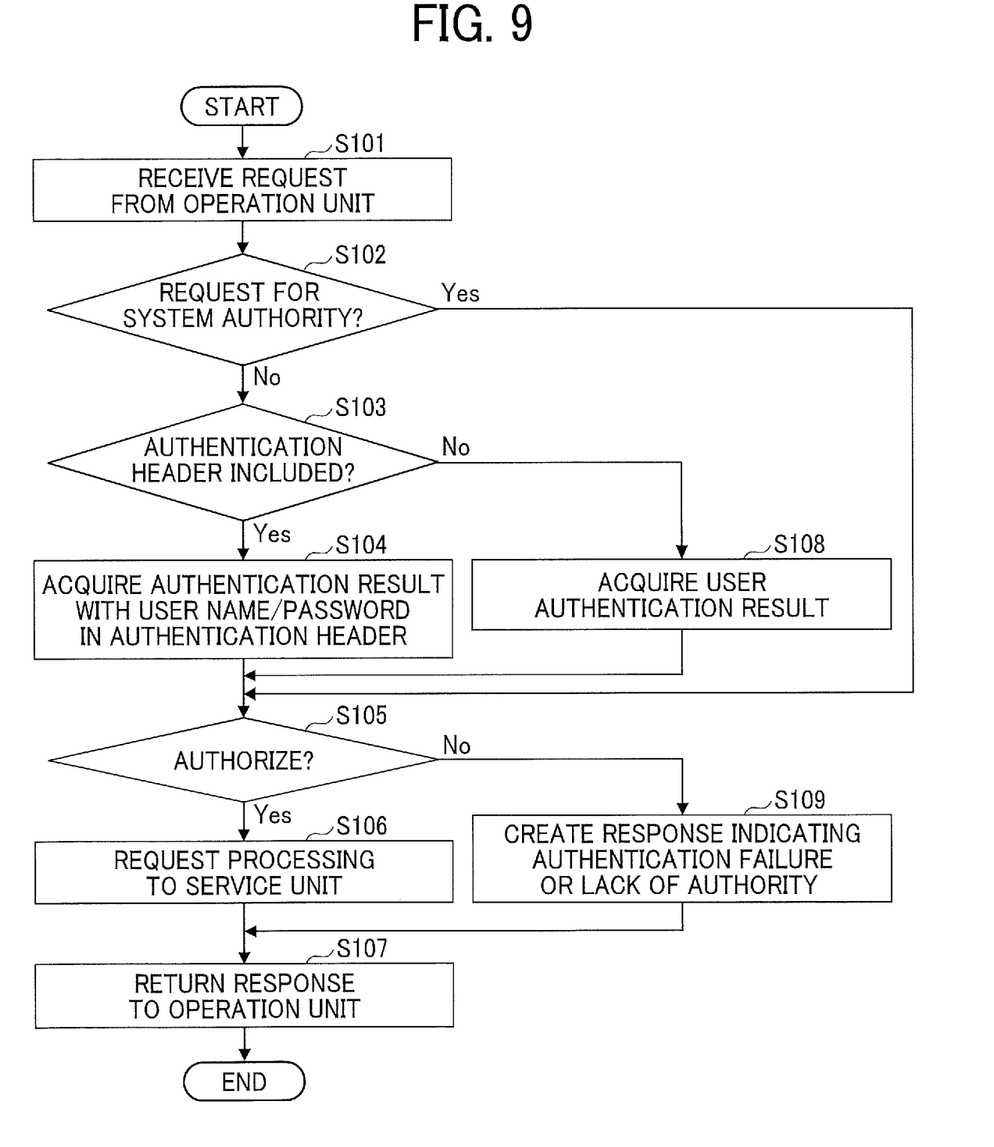
FIG. 9 is a flowchart illustrating an example of processing executed by a main unit.

FIG. 9 is a flowchart illustrating an example of processing executed by the main unit 90. The process of FIG. 9 starts, for example, while the image forming apparatus 100 is activated.

First, the request management unit 44 receives a request from the operation unit 80 (step S101). The request management unit 44 sends header information to the resource control unit 45.

The resource control unit 45 determines whether the request is for a system authority based on the header information (step S102). The system authority is a special authority required when the operation unit 80 receives an event asynchronously. The system authority is different from administrator authority and general user authority. Whether the request is for the system authority or not is determined based on, for example, the URL of the request line of the header information.

When determination in step S102 is yes, authentication based on the authentication header or the authentication information input by the user is not performed, so the process proceeds to step S105, and when determination in step S102 is no, the process proceeds to step S103.

In step S103, the resource control unit 45 determines whether the request includes an authentication header. The determination in step S103 depends whether or not there is a header line of OneShotAuthorization in the header information.

When the authentication header exists (Yes in step S103), the resource control unit 45 requests the authentication control unit 43 to perform authentication using the user name and password of the authentication header and acquires an authentication result in step S104. Thereby, the authentication result including authority of the operation unit application 50 is acquired.

When there is no authentication header (No in step S103), the resource control unit 45 acquires an authentication result of the user sent from the user login application 40 from the authentication control unit 43 in step S108. As a result, the authentication result including the authority of the user who has logged in is acquired from the user login application 40 of the operation unit 80. When the user is not logged in, the user login application 40 notifies that the user is not logged in to the resource control unit 45.

Next, the resource control unit 45 determines whether the request source (the operation unit application 50 or the user) has authority for the request in step S105. The authentication result contains the authority of the request source, and this authority is compared under the authority required for the API of the URL of the request line. When there is an authentication header, the authentication result of the authentication header is used, and when there is no authentication header, the user authentication result is used. That is, authority of the operation unit application 50 is compared with the authority required for the API of the URL of the request line, or the authority of the user is compared with the authority required for the API of the URL of the request line.

When a request is for system authority, although a request source is neither a general user nor an administrator, it is assumed that header information of the request includes information indicating that the request source is the operation unit 80. Thus, whether the request source has the system authority for the request can be determined.

When the request source has the authority for the request (Yes in step S105), the resource control unit 45 sends a processing request to the service unit 42 in step S106. The service unit 42 executes processing in accordance with contents of the request. When the processing is completed, the service unit 42 transmits a processing result to the result response unit 46 of the SDK control unit 41. The result response unit 46 creates a response including the processing result.

When there is lack of authority for the request (No in step S105), the resource control unit 45 notifies the result response unit 46 of authentication failure or lack of authority. The result response unit 46 creates a response of authentication failure or lack of authority in step S109.

In step S107, the result response unit 46 transmits a response to the request transmitted from the operation unit 80.

According to the process illustrated in FIG. 9, the service unit 42 can be used with the authority of the operation unit application 50, when the request has an authentication header. In this case, the user may or may not be logged in. Therefore, the operation unit application 50 can request the main unit 90 to process even when the user is not logged in.

In addition, even when a general user is logged in, if the operation unit application 50 logs in with administrator authority, for example, administrator authority information necessary for the operation unit application 50 to operate can be acquired. When the administrator logs in, but the operation unit application 50 transmits a request with an authentication header, the operation is performed with the authority of the operation unit application 50. Therefore, if the authority of the operation unit application 50 is a general user, the operation unit application 50 can execute a job.

<Request from External Device>

In the above embodiments, an example in which authentication information is transmitted and a processing result is returned within one apparatus (image forming apparatus) has been described. However, in the following paragraphs, authentication between different apparatuses is described.

Figure 10:
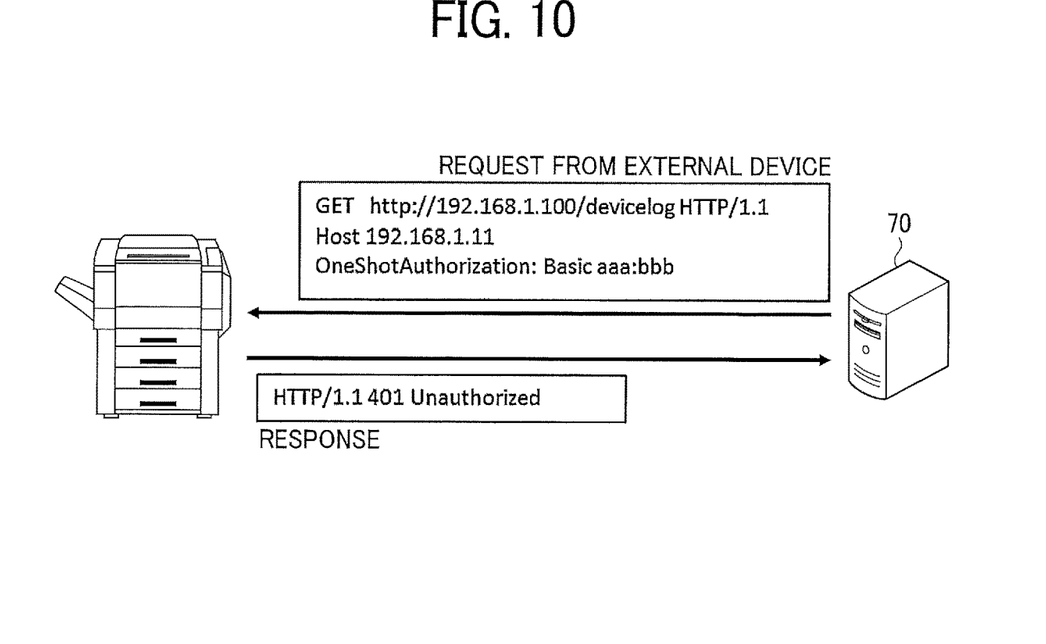
FIG. 10 is a diagram illustrating an example of a configuration of a system including the image forming apparatus and an external device.

FIG. 10 is a diagram illustrating an example of a configuration of a system including the image forming apparatus and an external device. The image forming apparatus 100 and the external device 70 can communicate through a network. The image forming apparatus 100 provides a web API to the external device 70, and the external device 70 can communicate with the image forming apparatus 100 through the web API. For example, a printer driver or browser software operating on a PC as the external device 70 can acquire and display information on the image forming apparatus 100. Another example of the external device 70 is a server that acquires information of the image forming apparatus 100 and monitors an abnormality of the image forming apparatus 100.

However, when the external device 70 can change the general user authority or the administrator authority by the presence of the authentication header in the request transmitted by the external device 70, there is a possibility that it is not preferable in terms of security. For this reason, it is preferable that the image forming apparatus 100 ignores the request from the external device 70 transmitted through the network even if the authentication header is included.

In FIG. 10, although the authentication header (OneShot-Authorization) exists in the request transmitted by the external device 70, the image forming apparatus 100 ignores the authentication header. Therefore, the request is considered as received from a general external device 70. Therefore, the process illustrated in FIG. 9 described above is not performed. The image forming apparatus 100 determines that a request requiring administrator authority such as device log is not authorized, even if authentication fails or there is authentication information other than the authentication header and authentication is successful.

The functional block diagram for supporting the external device 70 may be the same as the functional block diagram illustrated in FIG. 4, and the request management unit 44 receives the request transmitted by the external device 70. The external device 70 may be a general PC, a tablet terminal, a smartphone, a wearable PC, or the like.

Figure 11:
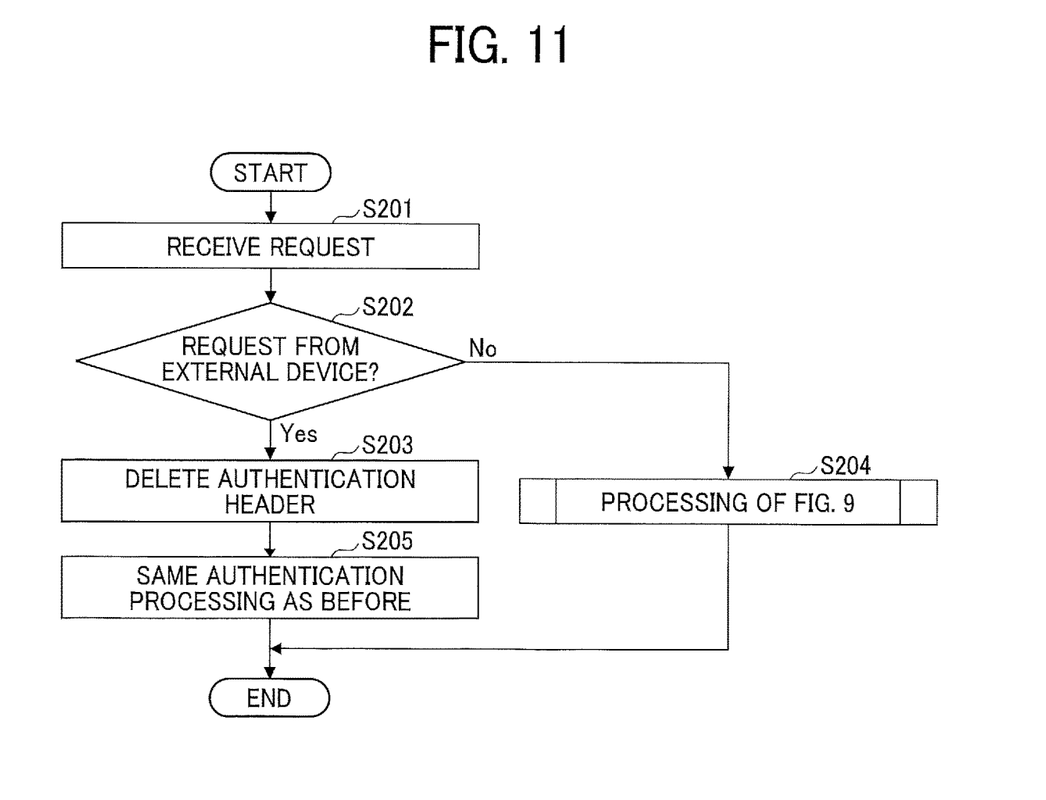
FIG. 11 is a flowchart illustrating an example of processing a request from the external device.

FIG. 11 is a flowchart illustrating an example of processing a request from the external device 70.

First, the request management unit 44 receives a request in step S201. The request management unit 44 sends header information to the resource control unit 45.

The resource control unit 45 determines whether the request has been received from the external device 70 in step S202. The resource control unit 45 may confirm an Internet Protocol (IP) address of the transmission source of the request to determine whether the request has been received from the external device 70. In this case, the IP address of the operation unit 80 is stored in advance by the resource control unit 45, and this IP address is compared with the IP address of the transmission source. Alternatively, the resource control unit 45 may pass identification information such as a token to the operation unit 80 in advance and determine whether the token is included in the header information.

When the determination in step S202 is Yes, the resource control unit 45 deletes the authentication header in step S203. Alternatively, either the authentication header is ignored, or it is assumed that there is no authentication header.

When the determination in step S202 is No, the resource control unit 45 does not delete the authentication header, and the process illustrated in FIG. 9 is executed.

When the authentication header is deleted, the resource control unit 45 performs the same authentication processing as in the past on the authentication request from the external device in step S205.

Therefore, since the authentication header is deleted from the request from the external device 70, the request is considered as a conventional request from the external device 70, processing based on the authentication and the authority can be performed, and security is not degraded.

Other Embodiments

As described above, the best mode for carrying out the present disclosure has been described using the examples, but the present disclosure is not limited to these examples at all, and various modifications and substitution can be made without departing from the scope of the present disclosure.

For example, although the image forming apparatus 100 has been described as an example in the present embodiment, the present disclosure is not limited to the image forming apparatus 100 and can be applied to an information processing apparatus having a function of authentication. As an example of the information processing apparatus, an electronic whiteboard, a projector, a video conference terminal, or the like may be considered.

Further, the example of configuration illustrated in FIG. 4 and the like are divided according to main functions in order to facilitate understanding of processing by the image forming apparatus 100. The present disclosure is not limited by the method and name of division of processing units. The processing executed by the image forming apparatus 100 can also be divided into more processing units according to the processing content. Also, one processing unit can be divided so as to include more processes.

The authentication information for which the user login application 40 receives an input is an example of the first authentication information, the authentication header is an example of the second authentication information, and the operation unit application 50 is an example of the first application software, the user login application 40 is an example of second application software.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   circuitry configured to:
   authenticate a user based on first authentication information input by a user to generate an authentication result based on the first authentication information;
   receive an authentication request generated by first application software;
   authenticate the first application software based on second authentication information to generate an authentication result based on the second authentication information when the authentication request includes the second authentication information;
   acquire the authentication result of the user based on the first authentication information when the authentication request does not include the second authentication information; and
   execute processing based on one of the authentication result based on the first authentication information and the authentication result based on the second authentication information;
   an operation unit including first circuitry configured to execute the first application software and second application software; and
   a main unit including second circuitry configured to communicate with the operation unit,
   the circuitry including the first circuitry and the second circuitry,
   wherein the first application software operates in background and the second application software accepts the user input of the first authentication information and transmits the first authentication information to the main unit,
   the second circuitry of the operation unit is configured to execute the first application software to determine whether or not to include the second authentication information in the authentication request, and transmit the authentication request to the main unit, and
   the circuitry is configured to execute the processing based on the authentication result based on the second authentication information without a user to log in the information processing apparatus.

2. The information processing apparatus of claim 1, wherein
   the circuitry is further configured to determine whether the first authentication information is not input by the user, and
   when the circuitry determines that the first authentication information is not input, the circuitry controls not to perform the authentication based on the first authentication information, and
   when the authentication request includes the second authentication information, the circuitry is configured to:
   execute processing based on the authentication result based on the second authentication information.

3. The information processing apparatus of claim 1, wherein
   when the authentication result based on the second authentication information includes administrator authority, and when the authentication result based on the first authentication information includes general user authority, the circuitry is configured to execute processing based on the administrator authority.

4. The information processing apparatus of claim 1, wherein
   when the authentication result based on the second authentication information includes the general user authority, and when the authentication result based on the first authentication information includes the administrator authority, the circuitry is configured to execute processing based on the general user authority.

5. The information processing apparatus of claim 1, wherein the second authentication information is included in header information of the authentication request.

6. The information processing apparatus of claim 1, wherein when the authentication request including the second authentication information is received from an external device configured to communicate with the information processing apparatus through a network, the circuitry is configured to determine that the authentication request does not include the second authentication information.

7. An authentication method comprising:
   authenticating a user based on first authentication information input by a user to generate an authentication result based on the first authentication information;
   receiving an authentication request generated by first application software;
   authenticating the first application software based on second authentication information to generate an authentication result based on the second authentication information when the authentication request includes the second authentication information;
   acquiring the authentication result of the user based on the first authentication information when the authentication request does not include the second authentication information;
   executing processing based on one of the authentication result based on the first authentication information and the authentication result based on the second authentication information;

accepting the user input of the first authentication information using second application software that operates on an operation unit of an information processing apparatus;

transmitting the first authentication information to a main unit of the information processing apparatus using the second application software;

determining whether or not to include the second authentication information in the authentication request using first application software that operates in background on the operation unit; and transmitting the authentication request to the main unit of the information processing apparatus using the first application software, wherein the executing is performed based on the authentication result based on the second authentication information without a user to log in the information processing apparatus.

8. The authentication method of claim 7, further comprising:

determining whether the first authentication information is not input by the user;

controlling not to perform the authentication based on the first authentication information when the determining determines that the first authentication information is not input; and executing processing based on the authentication result based on the second authentication information, when the authentication request includes the second authentication information.

9. The authentication method of claim 7, wherein:

when the authentication result based on the second authentication information includes administrator authority, and when the authentication result based on the first authentication information includes general user authority, the executing incudes executing processing based on the administrator authority.

10. The authentication method of claim 7, wherein:

when the authentication result based on the second authentication information includes the general user authority and when the authentication result based on the first authentication information includes the administrator authority, the executing includes executing processing based on the general user authority.

11. The authentication method of claim 7, wherein the second authentication information is included in header information of the authentication request.

12. The authentication method of claim 7, further comprising determining that the authentication request does not include the second authentication information, when the authentication request including the second authentication information is received from an external device configured to communicate with an information processing apparatus through a network.

13. A non-transitory recording medium storing instructions which, when executed by one or more processors, cause the processors to perform an information processing method comprising:

authenticating a user based on first authentication information input by a user to generate an authentication result based on the first authentication information;

receiving an authentication request generated by first application software;

authenticating the first application software based on second authentication information to generate an authentication result based on the second authentication information when the authentication request includes the second authentication information;

acquiring the authentication result of the user based on the first authentication information when the authentication request does not include the second authentication information;

executing processing based on one of the authentication result based on the first authentication information and the authentication result based on the second authentication information;

accepting the user input of the first authentication information using second application software that operates on an operation unit of an information processing apparatus;

transmitting the first authentication information to a main unit of the information processing apparatus using the second application software;

determining whether or not to include the second authentication information in the authentication request using first application software that operates in background on the operation unit; and transmitting the authentication request to the main unit of the information processing apparatus using the first application software, wherein the executing is performed based on the authentication result based on the second authentication information without a user to log in the information processing apparatus.

* * * * *